United States Patent
Shehab (10) Patent No.: US 10,907,679 B2
(45) Date of Patent: Feb. 2, 2021

(54) FASTENING TOOL SYSTEMS AND METHODS

(71) Applicant: THE BOEING COMPANY, Chicago, IL (US)

(72) Inventor: Kareem Gamal Shehab, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 281 days.

(21) Appl. No.: 15/701,520

(22) Filed: Sep. 12, 2017

(65) Prior Publication Data

US 2019/0078606 A1 Mar. 14, 2019

(51) Int. Cl.
| | |
|---|---|
| *F16B 39/02* | (2006.01) |
| *F16B 35/04* | (2006.01) |
| *F16B 35/02* | (2006.01) |
| *F16B 21/09* | (2006.01) |
| *B64F 5/00* | (2017.01) |

(52) U.S. Cl.
CPC ............ *F16B 39/023* (2013.01); *F16B 21/09* (2013.01); *F16B 35/02* (2013.01); *F16B 35/041* (2013.01); *B64F 5/00* (2013.01)

(58) Field of Classification Search
CPC ........ F16B 39/023; F16B 21/02; F16B 35/02; F16B 35/041
USPC ..... 29/278, 255, 251, 277, 254; 269/3, 6, 95
See application file for complete search history.

(56) References Cited

U.S. PATENT DOCUMENTS

| | | | | |
|---|---|---|---|---|
| 3,529,497 A | * | 9/1970 | Brooks | B25B 27/02 173/91 |
| 3,633,250 A | * | 1/1972 | Romney | A47F 7/163 16/387 |
| 3,943,817 A | * | 3/1976 | Mess | F16B 35/02 411/385 |
| 4,478,546 A | * | 10/1984 | Mercer | F16B 35/02 411/385 |
| 5,090,102 A | * | 2/1992 | Lovell | B25B 27/06 29/255 |
| 5,875,534 A | * | 3/1999 | Jackson | B25B 27/02 29/255 |
| 5,980,180 A | * | 11/1999 | Schiess | F16B 21/18 411/339 |
| 6,880,787 B2 | | 4/2005 | Stephens | |
| 7,752,944 B2 | * | 7/2010 | Wallek | B25B 27/02 411/44 |
| 7,941,914 B2 | * | 5/2011 | Castiglione | H01R 43/22 29/278 |

(Continued)

*Primary Examiner* — Lee D Wilson
*Assistant Examiner* — Thomas Raymond Rodgers
(74) *Attorney, Agent, or Firm* — The Small Patent Law Group LLC; Joseph M. Butscher (57) ABSTRACT

A fastening tool system includes a housing including a main body having a proximal end and a distal end. The main body defines an internal chamber extending between a proximal opening at the proximal end and a distal opening at the distal end. A plunger includes a stem that extends into the internal chamber through the proximal opening. The plunger is configured to be moved in relation to the main body between a retracted position and an extended position. A securing stud is in a collapsed position when the plunger is in the retracted position. The plunger is configured to move into the extended position to engage the securing stud to expand the securing stud into an expanded position.

20 Claims, 6 Drawing Sheets

(56) References Cited

U.S. PATENT DOCUMENTS

| | | | |
|---|---|---|---|
| 7,946,010 B1* | 5/2011 | Myers | B26F 1/0015 |
| | | | 29/213.1 |
| 9,470,252 B2* | 10/2016 | Karls | F16B 2/04 |
| 9,634,472 B2* | 4/2017 | Kaml | F16M 13/022 |
| 2004/0021042 A1* | 2/2004 | Stephen | F16B 35/06 |
| | | | 248/68.1 |
| 2004/0223829 A1 | 11/2004 | Barnett | |
| 2005/0121560 A1* | 6/2005 | Slyter | F16B 5/0685 |
| | | | 248/71 |
| 2006/0231690 A1* | 10/2006 | Cooley | F16B 21/086 |
| | | | 248/71 |
| 2010/0266093 A1* | 10/2010 | Matsumoto | G21C 15/25 |
| | | | 376/372 |
| 2013/0074657 A1* | 3/2013 | Bishop | B25B 23/101 |
| | | | 81/53.1 |
| 2015/0266175 A1* | 9/2015 | Billett | B25B 27/20 |
| | | | 29/426.2 |
| 2016/0263733 A1* | 9/2016 | Marquis | B25B 27/02 |
| 2018/0066420 A1* | 3/2018 | Beck | B08B 9/027 |

\* cited by examiner

FASTENING TOOL SYSTEMS AND METHODS

FIELD OF THE DISCLOSURE

Examples of the present disclosure generally relate to fastening tool systems and methods, and, more particularly, to fastening tool systems that are configured to be quickly and easily secured to and removed from one or more components.

BACKGROUND OF THE DISCLOSURE

As a vehicle, such as a commercial aircraft, is manufactured, ring posts may be secured to various components. For example, ring posts may be secured to portions of a fuselage or a wing during the manufacturing process of a commercial aircraft. The ring posts are used to hold wire bundles out of the way while work is being performed on a particular component.

Typically, ring posts include threaded fasteners at a distal end. In order to secure a ring post to a component, an individual needs to insert the threaded end of the fastener into a threaded opening of the component, and then rotate the ring post to securely connect the ring post to the component. After the work on the component is completed, the ring post is then rotated in an opposite direction to remove the ring post from the component.

As can be appreciated, the process of individually rotating and threadably coupling ring posts to a component is time and labor intensive. For example, for certain wing assemblies of commercial aircraft, the process of installing ring posts may take up to eight hours.

Further, the process of individually rotating and removing the ring posts from the component is also time and labor intensive. For example, the process of removing the ring posts from certain wing assemblies may also last as long as eight hours.

Moreover, numerous rings posts are used when manufacturing large, complex products, such as commercial aircraft. As such, an increased amount of time and labor is needed to install and remove the ring posts with respect to such large, complex products. Further, individually rotating numerous ring posts (both during securing and removal stages) may increase a likelihood of repetitive stress injuries (such as carpal tunnel syndrome) in certain individuals.

SUMMARY OF THE DISCLOSURE

A need exists for a quick and efficient system and method of securing and removing a tool assembly in relation to one or more components. Further, a need exists for a system and method that reduces a manufacturing time of a large, complex product, such as a commercial aircraft. Also, a need exists for a tool system that reduces a likelihood of repetitive stress injury.

With those needs in mind, certain examples of the present disclosure provide a fastening tool system that includes a housing including a main body having a proximal end and a distal end. The main body defines an internal chamber extending between a proximal opening at the proximal end and a distal opening at the distal end. A plunger includes a stem that extends into the internal chamber through the proximal opening. The plunger is configured to be moved in relation to the main body between a retracted position and an extended position. A securing stud is in a collapsed position when the plunger is in the retracted position. The plunger is configured to move into the extended position to engage the securing stud to expand the securing stud into an expanded state.

In at least one example, the securing stud includes a securing shaft extending out of the distal opening. The securing shaft is configured to be moved into and out of an opening of a component when the securing stud is in the collapsed position. The securing shaft is configured to couple to the component within the opening when the securing stud is in the expanded position. In at least one embodiment, the securing shaft securely couples to the component within the opening without being rotated.

The plunger may include a handle connected to the stem. The housing may include a plurality of annular collars extending from the main body. The annular collars are configured to retain one or more wires between the plurality of annular collars.

In at least one example, the securing shaft includes a threaded outer surface that is configured to threadably engage a component within an opening.

In at least one example, the stem includes a distal nose that is configured to move into and expand the securing stud when the plunger is moved into the extended position.

In at least one example, the securing stud includes a first stud portion and a second stud portion that is distinct from the first stud portion. The first stud portion abuts against the second stud portion when the securing stud is in the collapsed position. The first stud portion is axially spread apart from the second stud portion when the securing stud is in the expanded position.

Each of the first stud portion and the second stud portion may include a head section and a shaft section. A head of the securing stud is defined by the head sections of the first stud portion and the second stud portion. An outer surface of the shaft section may be threaded. A securing shaft of the securing stud is defined by the shaft sections of the first stud portion and the second stud portion. A central stem channel recess is defined through one or both of the head section and the shaft section. The central stem channel recesses of the first and second stud portions define a stem channel that is configured to receive the stem.

One or both of the housing and the plunger may include a frangible area that is configured to be broken to remove portions of the housing and the plunger from one or more components while the securing stud remains coupled to the one or more components.

Certain examples of the present disclosure provide a fastening tool method that includes moving a plunger in relation to a main body of a housing between a retracted position and an extended position, collapsing a securing stud into a collapsed position in response to the plunger moving into the retracted position, and expanding the securing stud into an expanded position in response to the plunger moving into the extended position. The expanding includes engaging the securing stud with the plunger.

The fastening tool method may include moving the securing stud in the collapsed position into and out of an opening of a component, and coupling the securing stud in the expanded position to the component within the opening. In at least one embodiment, the coupling includes refraining from rotating the securing stud relative to the component.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain examples of the present disclosure provide a fastening tool system that allows for quick installation and removal of threaded parts from one or more components (such as panels, brackets, boards, rails, tracks, blocks, beams, and/or the like). The fastening tool system includes a split fastening or securing stud that may be secured to a component without the need to rotate or otherwise turn the securing stud.

Certain examples of the present disclosure provide a fastening tool system that is configured to be quickly and easily installed on and removed from one or more components. In at least one embodiment, the fastening tool system includes an axially-split threaded end having a threaded outer portion and a hollow center portion. The threaded end is configured to be selectively moved between an expanded position or state and a collapsed position or state. A handle is opposite the threaded end. The handle is configured to be moved between a retracted position and an extended position. The handle may be rotated approximately a quarter of a turn in the extended position to move the axially split threaded end into the expanded position such that the fastener is secured to the part. A housing or main body between the threaded end and the handle may have a plurality of radial protuberances, such as collars or ribs, that are configured to retain wiring. In at least one embodiment, the threaded outer portion of the axially-split threaded end includes a non-circular cross section that allows the securing stud to be easily inserted into a threaded opening of a component in the collapsed position.

Figures 1, 2:
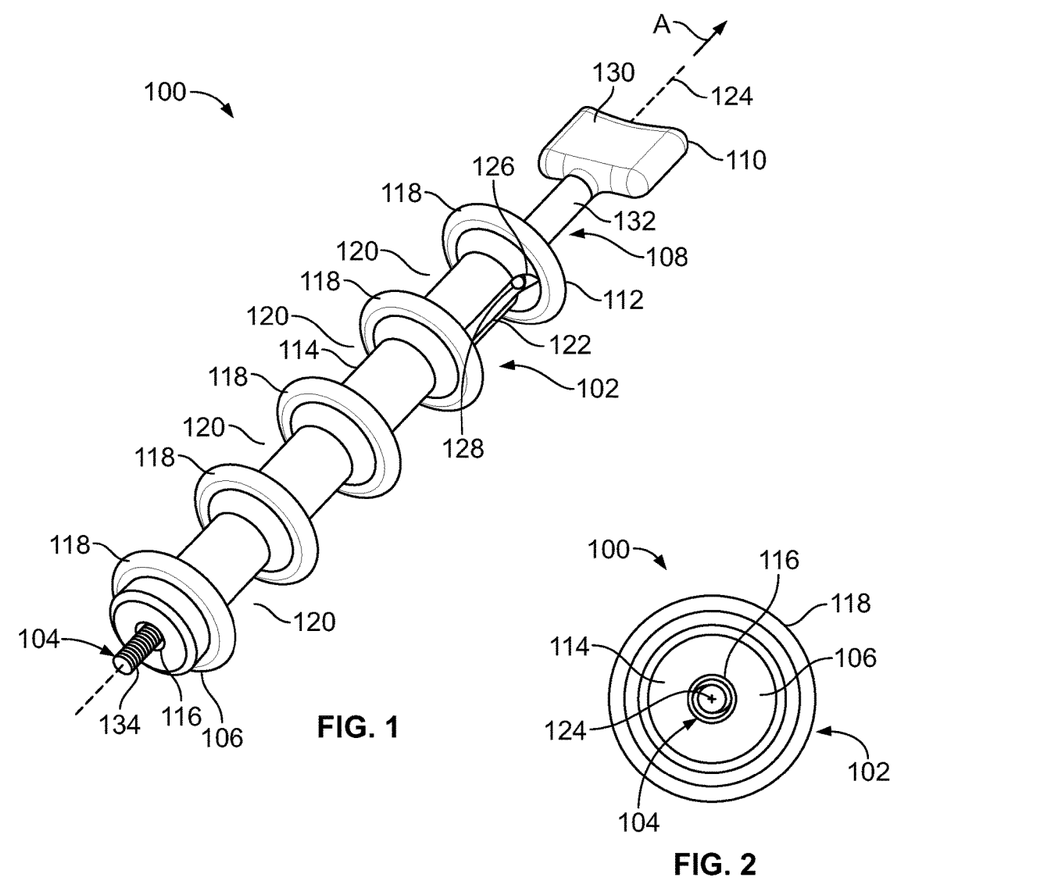
FIG. 1 illustrates a perspective view of a fastening tool system, according to an example of the present disclosure.
FIG. 2 illustrates a distal end view of a fastening tool system, according to an example of the present disclosure.

FIG. 1 illustrates a perspective view of a fastening tool system 100, according to an example of the present disclosure. The fastening tool system 100 includes a housing 102 that retains a securing stud 104 at a distal end 106, and a plunger 108 having a handle 110 extending outwardly from a proximal end 112.

The housing 102 includes a main body 114, which may be formed as a tube, extending between the distal end 106 and the proximal end 112. The main body 114 defines an internal chamber (hidden from view in FIG. 1) that extends between a proximal opening (hidden from view in FIG. 1) and a distal opening 116. A plurality of annular collars 118 radially and outwardly extend from the main body 114. Neighboring (that is, closest) annular collars 118 are spaced apart from one another. A recessed wire-retaining area 120 is defined between neighboring annular collars 118. The annular collars 118 are configured to retain wires and/or wire bundles therebetween within the wire-retaining areas 120. The main body 114 may include more or less annular collars 118 than shown. In at least one example, the main body 114 may not include any annular collars 118

Longitudinal channels 122 may extend through the main body 114 between the two neighboring collars 118 proximate to the handle 110 of the plunger 108. The longitudinal channels 122 are axially-aligned and parallel to a central longitudinal axis 124 of the fastening tool system 100. The longitudinal channels 122 provide open tracks that retain ends 126 of a cross bar 128 of the plunger 108. Longitudinal motion of the cross bar 128 through the channels 122 and the plunger 108 in the directions of arrows A is limited by the length of the channels 122 and the neighboring collars 118 between which the channels 122 are defined. Alternatively, the main body 114 may not include the longitudinal channels 122, and the plunger 108 may not include the cross bar 128.

The plunger 108 includes the handle 110, which may be or include an expanded grasping member 130, such as a block, fin, tab, and/or the like. A stem 132 extends from the handle 110 into the internal chamber of the main body 114 through the proximal opening. The stem 132 extends through the main body 114 and is configured to engage the securing stud 104. The plunger 108 is configured to be moved relative to the housing 102 between a retracted position (as shown in FIG. 1) and an extended position. When the plunger 108 is in the retracted position, the securing stud 104 is in a collapsed position. When the plunger 108 is in the extended position, the securing stud 104 is in an expanded position.

The securing stud 104 includes a threaded outer surface 134. The threaded outer surface 134 is configured to threadably engage a threaded inner surface of a component that defines an opening.

FIG. 2 illustrates a distal end view of the fastening tool system 100. As shown, the securing stud 104 extends out of the distal opening 116 formed through the main body 114 of the housing 102. At least in the collapsed state (as shown in FIGS. 1 and 2), the securing stud 104 may be coaxially aligned with the central longitudinal axis 124 of the fastening tool system 100.

Figure 3:
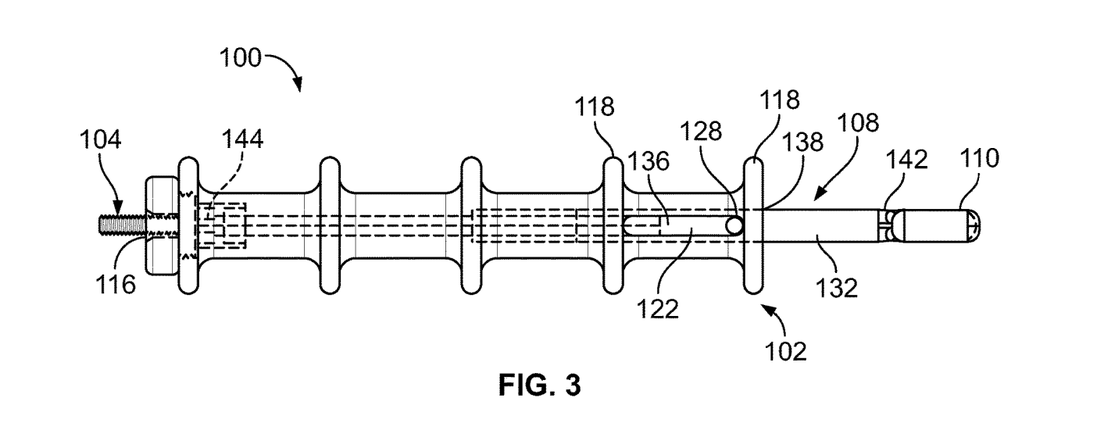
FIG. 3 illustrates a lateral view showing internal features of a fastening tool system, according to an example of the present disclosure.

FIG. 3 illustrates a lateral view showing internal features of the fastening tool system 100, according to an example of the present disclosure. The stem 132 of the plunger 108 passes into the internal chamber 136 of the housing 102 through the proximal opening 138. The stem 132 extends into the internal chamber 136. The stem 132 includes a proximal end 142 that connects to the handle 110, and a distal nose 144 that is configured to engage the securing stud 104.

Figure 4:
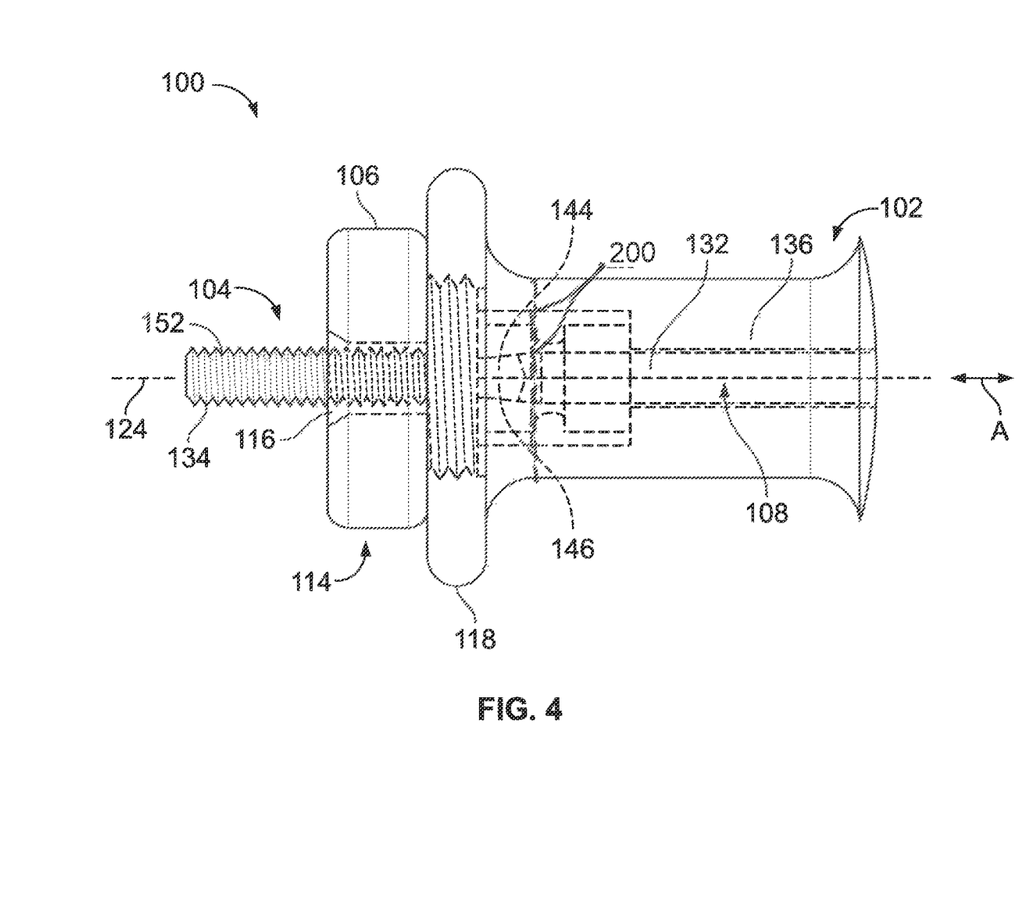
FIG. 4 illustrates a lateral view showing internal features of a distal end of the fastening tool system, according to an example of the present disclosure.

FIG. 4 illustrates a lateral view showing internal features of the distal end 106 of the fastening tool system 100. The securing stud 104 includes a head 150 defined by opposed head sections (as described with respect to FIGS. 5-12) and a securing shaft 152 defined by opposed shaft sections (as described with respect to FIGS. 5-12). The head 150 has a diameter or width that exceeds that of the shaft 152. The head 150 is sized and shaped so as to be axially trapped within the main body 114 of the housing 102. That is, the head 150 may be unable to axially shift or otherwise move in directions A along the central longitudinal axis 124. The diameter of the distal opening 116 formed through the main body 114 is large enough to allow the shaft 152 to pass therethrough, but substantially smaller than the diameter or width of the head 150, thereby preventing the head 150 from passing therethrough.

The distal nose 144 of the stem 132 may include a tapered tip 146 that is configured to pass into a channel formed through at least a portion of the securing stud 104. When the plunger 108 is in the retracted position (as shown in FIGS. 3 and 4), the distal nose 144 does not extend into the channel of the securing stud 104. As such, the securing stud 104 is in the collapsed position. When the plunger 108 is urged towards the securing stud 104 into the extended position, the tapered tip 146 passes into the channel of the securing stud 104, and the distal nose 144 expands opposed portions of the securing stud 104 apart with continued urging of the plunger 108, thereby expanding the securing stud 104 into the expanded position.

Figure 5:
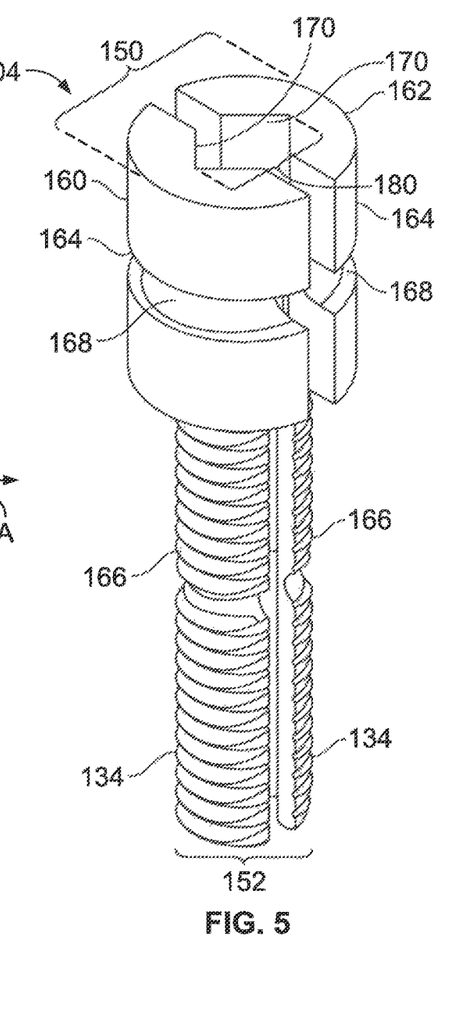
FIG. 5 illustrates a perspective view of a securing stud in an expanded position, according to an example of the present disclosure.
Figure 6:
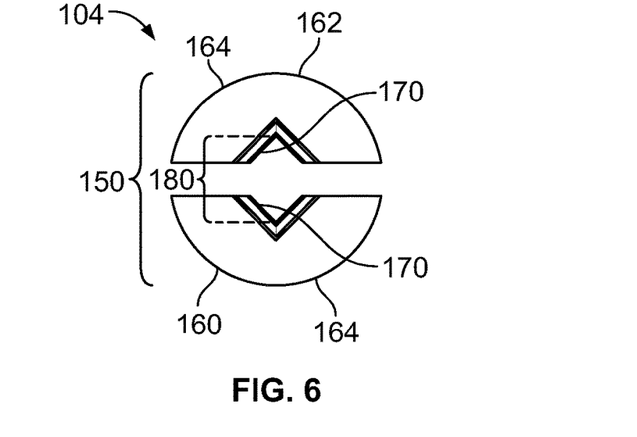
FIG. 6 illustrates a top view of a securing stud in an expanded position, according to an example of the present disclosure.
Figure 7:
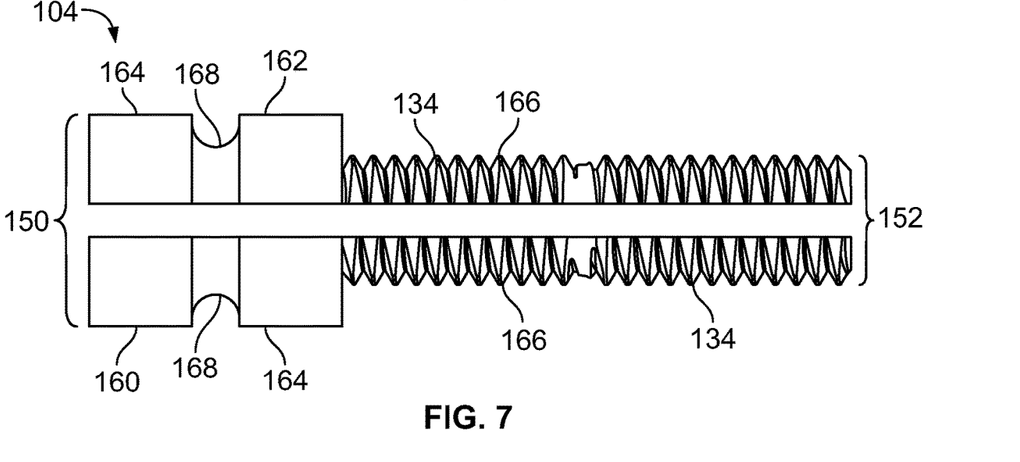
FIG. 7 illustrates a lateral view of a securing stud in an expanded position, according to an example of the present disclosure.
Figure 8:
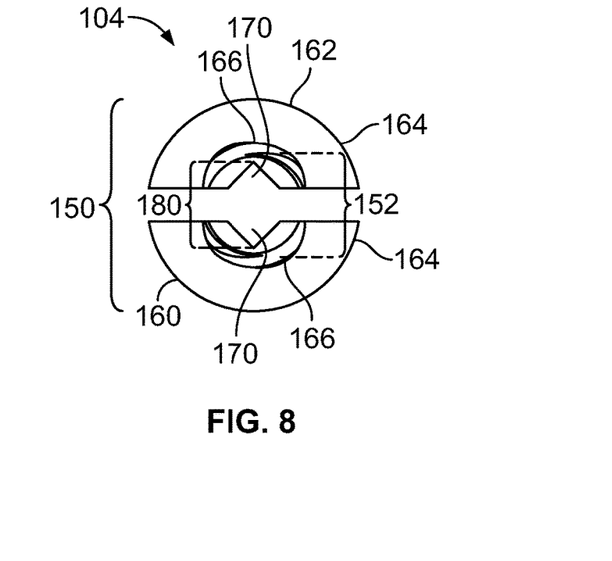
FIG. 8 illustrates a lateral view of a securing stud in an expanded position, according to an example of the present disclosure.

FIG. 5 illustrates a perspective view of the securing stud 104 in an expanded position, according to an example of the present disclosure. FIG. 6 illustrates a top view of the securing stud 104 in the expanded position. FIG. 7 illustrates a lateral view of the securing stud 104 in the expanded position. FIG. 8 illustrates a lateral view of the securing stud 104 in the expanded position. Referring to FIGS. 5-8, the securing stud 104 is formed by opposed first and second stud portions 160 and 162, such as first and second halves (or approximate halves). In at least one embodiment, the securing stud 104 is formed by axially-splitting a single stud along a central plane to form the two separate stud portions 160 and 162. In at least one other embodiment, each of the stud portions 160 and 162 may be separately formed.

The first stud portion 160 and the second stud portion 162 are distinct from one another. When the securing stud 104 is in the collapsed position, the first stud portion 160 abuts against (for example, directly connects to without any intervening structure therebetween) the second stud portion 162. When the securing stud 104 is in the expanded portion, the first stud portion 160 and the second stud portion 162 are spread apart from one another.

Each stud portion 160 includes a head section 164 and a shaft section 166. An outer surface of the shaft sections 166 may be threaded, thereby forming the threaded outer surface 134. The head sections 164 may include a recess 168. A reciprocal member (such as an annular protuberance) within the main body 114 of the housing 102 (shown in FIGS. 3 and 4) may be configured to couple to the recesses 168, so as to maintain the securing stud 104 in an axial position within the housing 102. Optionally, the stud portions 160 may not include the recessed 168.

The head 150 of the securing stud 104 is defined by the opposed head sections 164, while the securing shaft 152 is defined by the opposed shaft sections 166. As shown, each stud portion 160 and 162 includes a central stem channel recess 170 formed therethrough. The stem channel recesses 170 may extend through an entire length of the each shaft section 166. Optionally, the stem channel recesses 170 may extend through the head sections 164, or the head sections 164 and only a portion of the shaft sections 166. The opposed stem channel recesses 170 define a stem channel 180 that is configured to receive the distal nose 144 of the stem 132 of the plunger 108 (shown in FIG. 4, for example). The stem channel 180 may be sized and shaped so that rotation of the stem 132 positioned within the stem channel 180 causes the securing stud 104 to rotate in response thereto. Optionally, the stem channel 180 may be sized and shaped so as not to translate rotational motion of the stem 132 into the securing stud 104 (such as if the stem 132 and the stem channel 180 both have circular axial cross sections).

Figures 9, 10:
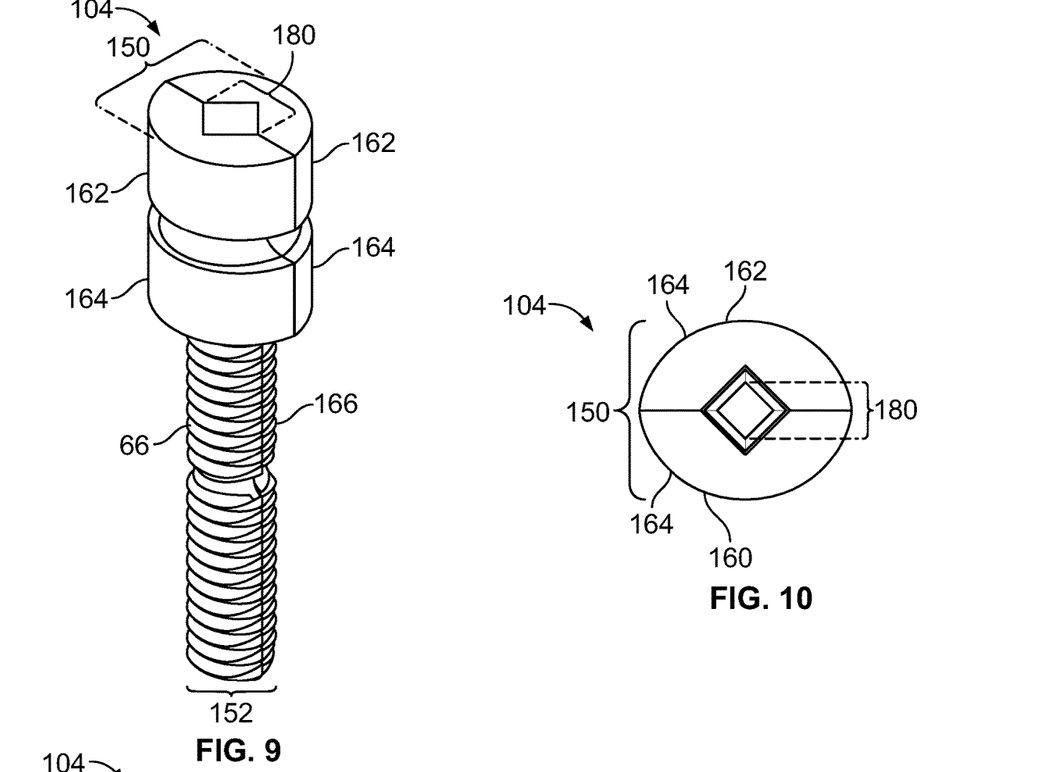
FIG. 9 illustrates a perspective view of a securing stud in a collapsed position, according to an example of the present disclosure.
FIG. 10 illustrates a top view of a securing stud in a collapsed position, according to an example of the present disclosure.
Figure 11:
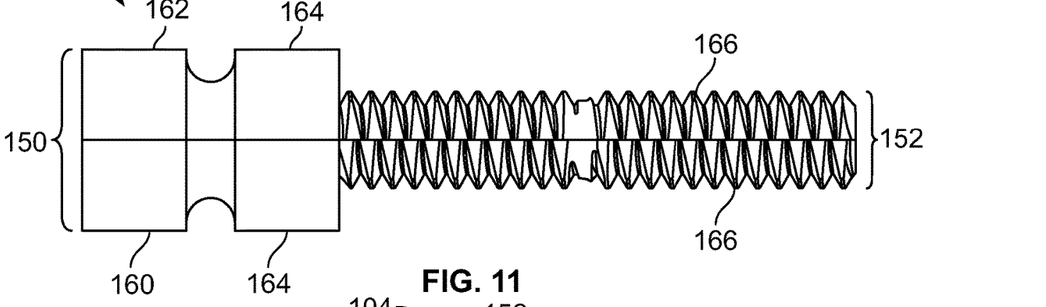
FIG. 11 illustrates a lateral view of a securing stud in a collapsed position, according to an example of the present disclosure.
Figure 12:
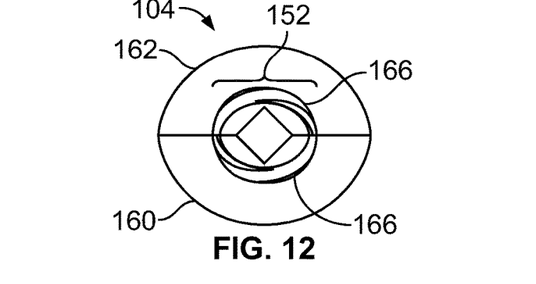
FIG. 12 illustrates a lateral view of a securing stud in a collapsed position, according to an example of the present disclosure.

FIG. 9 illustrates a perspective view of the securing stud 104 in a collapsed position, according to an example of the present disclosure. FIG. 10 illustrates a top view of the securing stud 104 in the collapsed position. FIG. 11 illustrates a lateral view of the securing stud 104 in the collapsed position. FIG. 12 illustrates a lateral view of the securing stud 104 in the collapsed position. Referring to FIGS. 9-12, the shaft sections 166 are formed so that in the collapsed position, the diameter of the securing shaft 152 is less than a diameter of an opening of a component into which the securing shaft 152 is to be positioned. As such, in the collapsed position, the securing shaft 152 of the securing stud 104 is able to pass into the opening of the component. For example, the opening of the component may have a circular axial cross section having a first diameter, while the diameter of the securing shaft 152 in the collapsed position has a second diameter that is less than the first diameter. A shown in FIG. 12, in particular, an outer diameter of the securing shaft 152 in the collapsed position may be oblong or elliptical, which allows the securing shaft 152 to be inserted into the opening of the component in the collapsed position.

Referring to FIGS. 1-4 and 9-12, in order to insert the securing stud 104 into the opening of the component, the plunger 108 is pulled back into the retracted position, as shown in FIG. 1, for example. In the retracted position, the distal nose 144 of the stem 132 is not extended into the stem channel 180 of the collapsed securing stud 104 so as to separate the stud portions 160 and 162 from one another. The collapsed securing stud 104 is then axially aligned with the opening of the component, and then the fastening tool system 100 is urged toward the opening so that the collapsed securing shaft 152 passes into the opening. In this position, the distal end 106 of the main body 114 of the housing 102 may abut into a surface of the component that defines the opening.

Referring to FIGS. 1-8, in order to secure the fastening tool system 100 to the component, the plunger 108 is then urged towards the housing 102, thereby causing the distal nose 144 of the stem 132 to pass into the stem channel 180. As the distal nose 144 passes into the stem channel 180, the distal nose 144 separates the stud portions 160 and 162, which causes the expanded stud portions 160 and 162 to engage the threaded inner surfaces of the opening, thereby securing the fastening tool system 100 to the component. The distal nose 144 between the outwardly-expanded stud portions 160 and 162 prevents the stud portions 160 and 162 from collapsing back towards one another. As such, the fastening tool system 100 is secured to the component without the need for rotating or turning the fastening tool system 100, or any portion thereof. Nevertheless, the fastening tool system 100 may be rotated (or the plunger 108 may be rotated via the handle 110, which may cause a corresponding rotation in the securing stud 104), such as through a quarter turn, to provide additional threading engagement between the threaded outer surface 134 of the expanded securing stud 104 and the internal threads of the opening of the component.

As described, the plunger 108 is moved into the extended position, which moves the securing stud 104 into the expanded position. As the securing stud 104 expands into the expanded position, the securing stud 104 securely engages interior surfaces of the component that define an opening, which causes the fastening tool system 100 to securely couple to the component without the need for rotation or turning.

In order to remove the fastening tool system 100 from the component, the plunger 108 is drawn back away from the housing 102. As the plunger 108 is drawn back (such as by an individual pulling the handle 110), the distal nose 144 of the stem 132 of the plunger 108 retreats from the stem channel 180, thereby causing the stud portions 160 and 162 to collapse towards one another so that the securing stud 104 is in the collapsed position. In the collapsed position, the diameter of the securing stud 104 is less than the diameter of the opening of the component, thereby causing the securing stud 104 to disengage from the component, and then the fastening tool system 100 may be pulled away from the component without the need for rotating or turning the fastening tool system 100.

Figure 13:
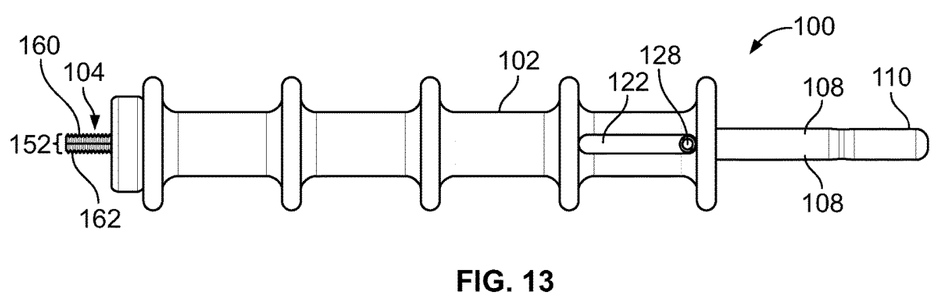
FIG. 13 illustrates a lateral view of a fastening tool system having a securing stud in a collapsed position, according to an example of the present disclosure.

FIG. 13 illustrates a lateral view of the fastening tool system 100 having the securing stud 104 in a collapsed position, according to an example of the present disclosure. In the collapsed position, the stud portions 160 and 162 are collapsed towards and into one another, thereby allowing the collapsed securing shaft 152 to be inserted into an opening of a component. The plunger 108 is drawn back into a retracted position, as shown in FIG. 13.

Figure 14:
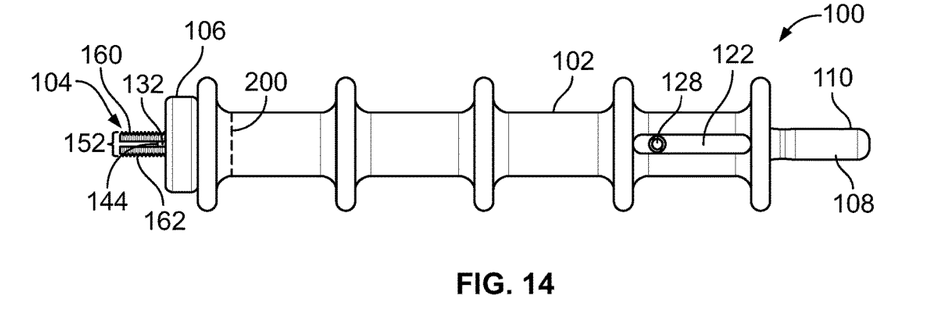
FIG. 14 illustrates a lateral view of a fastening tool system having a securing stud in an expanded position, according to an example of the present disclosure.

FIG. 14 illustrates a lateral view of the fastening tool system 100 having the securing stud 104 in an expanded position, according to an example of the present disclosure. The plunger 108 is urged into the housing 102 into the extended position, such that the distal nose 144 spreads the stud portions 160 and 162 apart into the expanded position.

In at least one embodiment, the fastening tool system 100 may include a frangible area 200 proximate to the distal end 106. The frangible area 200 may be a weakened area (such as a perforated ring) through the housing 102 and the stem 132. When the fastening tool system 100 is secured to a component through the expanded securing stud 104 (as shown in FIG. 4), an individual may break off the remainder of the fastening tool system 100 about the frangible area 200, leaving the securing stud 104 secured to one or more components. In this manner, the fastening tool system 100 may be used to permanently secure to one or more components via the expanded securing stud 104.

Figure 15:
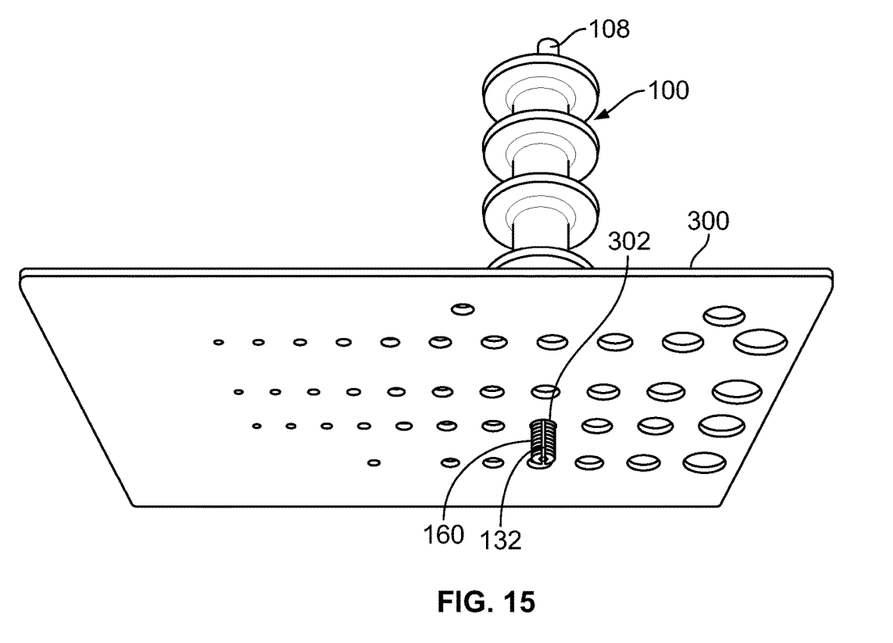
FIG. 15 illustrates a perspective view of a fastening tool system secured to a component, according to an example of the present disclosure.

FIG. 15 illustrates a perspective view of the fastening tool system 100 secured to a component 300, according to an example of the present disclosure. The component 300 may be various structures, such as a panel, bracket, board, rail, track, block, beam, and/or the like. The component 300 includes at least one opening 302, which may be defined by a threaded interior interface of the component 300, into which the securing stud 104 is inserted in the collapsed position, and expanded (as shown in FIG. 15) so that the outwardly spread stud portions 160 and 162 securely engage interior portions of the component 300 that define the opening 302, and are braced from inwardly collapsing by the distal nose 144 of the stem 132 (as shown and described with respect to FIGS. 3, 4, and 14, for example). As such, when the securing stud 104 is in the expanded position, the fastening tool system 100 is securely coupled to the component. In order to remove the fastening tool system 100 from the component 300, the plunger 108 is drawn back into a retracted position, thereby disengaging the distal nose 144 of the stem 132 from the securing stud 104, which causes the securing stud 104 to move into the collapsed position. As such, the fastening tool system 100 may be pulled away from the component 300.

The fastening tool system 100 may be used to secure to other components, as well. For example, an additional component may be positioned underneath the component 300, with openings of the two components axially aligned. The securing stud 104 may be inserted and expanded into both the aligned openings, as described above, in order to securely couple the fastening tool system 100 to the components.

Figure 16:
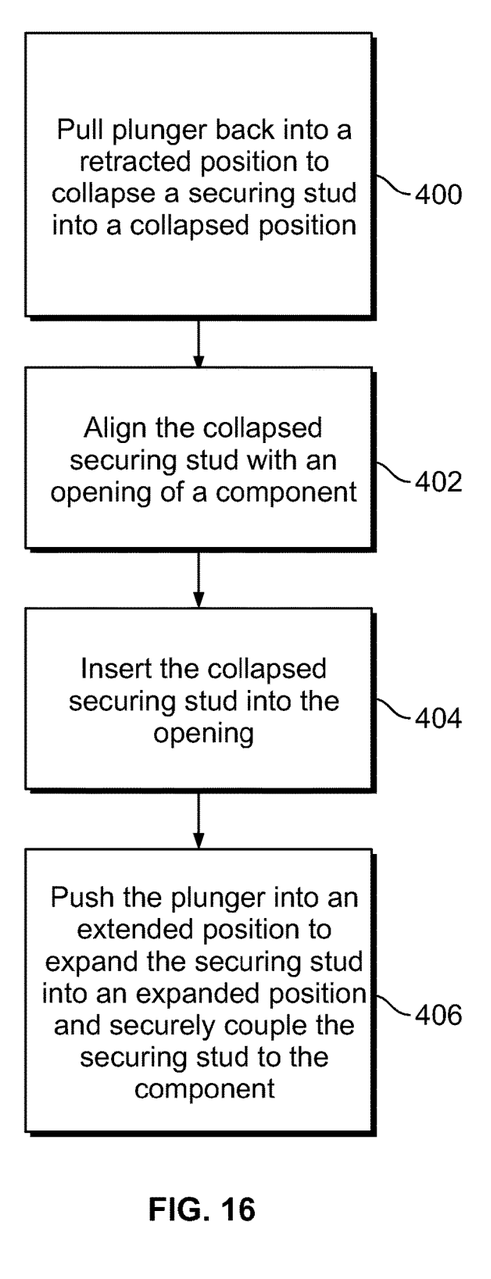
FIG. 16 illustrates a flow chart of a method of securely coupling a fastening tool system to a component, according to an example of the present disclosure.

FIG. 16 illustrates a flow chart of a method of securely coupling the fastening tool system 100 to the component 300, according to an example of the present disclosure. Referring to FIGS. 1-16, at 400, the plunger 108 is pulled back into the retracted position to collapse the mating stud 104 into the collapsed position. At 402, the collapsed securing stud 104 is then aligned with the opening 302 of the component 300. At 404, the collapsed securing stud 104 is inserted into the opening 302. At 406, the plunger 108 is then pushed into an extended position to expand the securing stud 104 into an expanded position, which securely couples the securing stud 104 (and therefore the fastening tool system 100) to the component 300.

Figure 17:
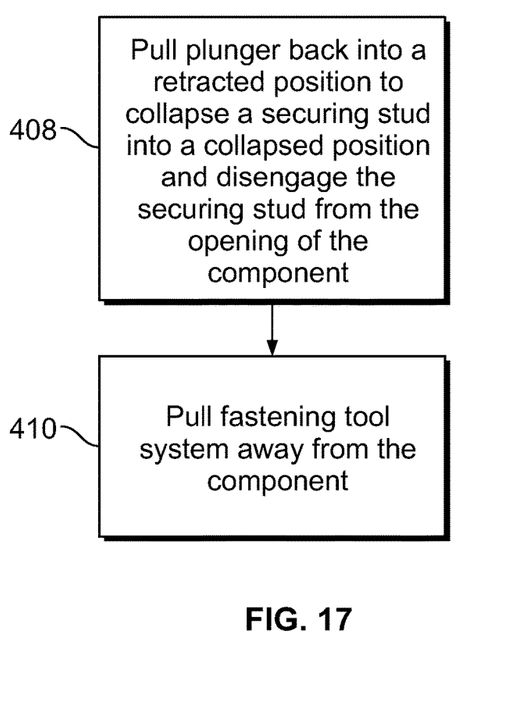
FIG. 17 illustrates a flow chart of a method of removing a fastening tool system from a component, according to an example of the present disclosure.

FIG. 17 illustrates a flow chart of a method of removing the fastening tool system 100 from the component 300, according to an example of the present disclosure. Referring to FIGS. 1-17, at 408, the plunger 108 is pulled back into the retracted position to collapse the mating stud 104 into the collapsed position and disengage the securing stud 104 from the opening 302 of the component 300. At 410, the fastening tool system 100 is then pulled away from the component 300.

As described herein, examples of the present disclosure provide systems and methods of quickly and efficiently securing and removing a fastening tool in relation to one or more components. Further, examples of the present disclosure provide systems and methods that reduce manufacturing times of large, complex products, such as a commercial aircraft. Also, examples of the present disclosure provide fastening tool systems and methods that reduce a likelihood of repetitive stress injuries.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A fastening tool system comprising:
    a housing including a main body having a proximal end and a distal end, wherein the main body defines an internal chamber extending between a proximal opening at the proximal end and a distal opening at the distal end;
    a plunger including a stem that extends into the internal chamber through the proximal opening, wherein the plunger is configured to be moved in relation to the main body between a retracted position and an extended position;
    a securing stud comprising a securing shaft extending out of the distal opening, and a threaded outer surface that is configured to threadably engage a component, wherein the securing stud is in a collapsed position when the plunger is in the retracted position, wherein an outer diameter of the securing shaft of the securing stud in the collapsed position is oblong, wherein the plunger is configured to move into the extended position to engage the securing stud to expand the securing stud into an expanded position; and
    a frangible area formed through the housing and the plunger, wherein the frangible area is configured to be broken to remove portions of the housing and the plunger from one or more components while the securing stud remains coupled to the one or more components.

2. The fastening tool system of claim 1, wherein the securing shaft is configured to be moved into and out of an opening of the component when the securing stud is in the collapsed position, and wherein the securing shaft is configured to couple to the component within the opening when the securing stud is in the expanded position.

3. The fastening tool system of claim 2, wherein the securing shaft couples to the component within the opening without being rotated.

4. The fastening tool system of claim 1, wherein the plunger further comprises a handle connected to the stem.

5. The fastening tool system of claim 1, wherein the housing further comprises a plurality of annular collars extending from the main body, wherein the annular collars are configured to retain one or more wires between the plurality of annular collars.

6. The fastening tool system of claim 1, wherein the stem comprises a distal nose that is configured to move into and expand the securing stud when the plunger is moved into the extended position.

7. The fastening tool system of claim 1, wherein the securing stud comprises a first stud portion and a second stud portion that is distinct from the first stud portion, wherein the first stud portion abuts against the second stud portion when the securing stud is in the collapsed position, and wherein the first stud portion is axially spread apart from the second stud portion when the securing stud is in the expanded position.

8. The fastening tool system of claim 7, wherein each of the first stud portion and the second stud portion comprises:
    a head section, wherein a head of the securing stud is defined by the head sections of the first stud portion and the second stud portion; and
    a shaft section including at least a portion of the threaded outer surface, wherein the securing shaft of the securing stud is defined by the shaft sections of the first stud portion and the second stud portion,
    wherein a central stem channel recess is defined through one or both of the head section and the shaft section, wherein the central stem channel recesses of the first and second stud portions define a stem channel that is configured to receive the stem.

9. A fastening tool method comprising:
moving a plunger in relation to a main body of a housing between a retracted position and an extended position;
collapsing a securing stud into a collapsed position in response to the plunger moving into the retracted position;
expanding the securing stud into an expanded position in response to the plunger moving into the extended position, wherein the expanding comprises engaging the securing stud with the plunger;
threadably engaging a component with a threaded outer surface of a securing shaft of the securing stud in the expanded position, wherein an outer diameter of the securing shaft of the securing stud in the collapsed position is oblong;
breaking a frangible area formed through the housing and the plunger after the securing stud is securely coupled to one or more components; and
removing one or more portions of the housing and the plunger after the breaking while the securing stud remains coupled to the one or more components.

10. The fastening tool method of claim 9, further comprising:
moving the securing stud in the collapsed position into and out of an opening of a component; and
coupling the securing stud in the expanded position to the component within the opening.

11. The fastening tool method of claim 10, wherein the coupling comprises refraining from rotating the securing stud relative to the component.

12. The fastening tool method of claim 9, further comprising retaining one or more wires between a plurality of annular collars extending from the main body of the housing.

13. The fastening tool method of claim 9, wherein the moving the plunger comprises:
urging a distal nose of a stem of the plunger into the securing stud when the plunger is moved into the extended position; and
expanding the securing stud with the distal nose when the plunger is moved into the extended position.

14. The fastening tool method of claim 9, further comprising:
directly connecting a first stud portion to a second stud portion of the securing stud in the collapsed position; and
spreading the first stud portion axially apart from the second stud portion when the securing stud is in the expanded position.

15. A fastening tool system comprising:
a housing including a main body having a proximal end and a distal end, and a plurality of annular collars extending from the main body, wherein the annular collars are configured to retain one or more wires therebetween, and wherein the main body defines an internal chamber extending between a proximal opening at the proximal end and a distal opening at the distal end;
a plunger including a stem that extends into the internal chamber through the proximal opening and a handle connected to the stem, wherein the stem comprises a distal nose, wherein the plunger is configured to be moved in relation to the main body between a retracted position and an extended position;
a securing stud including a securing shaft extending out of the distal opening, wherein the securing shaft comprises a threaded outer surface that is configured to threadably engage a component, wherein the securing stud is in a collapsed position when the plunger is in the retracted position, wherein an outer diameter of the securing shaft of the securing stud in the collapsed position is oblong, wherein the plunger is configured to move into the extended position to engage the securing stud to expand the securing stud into an expanded position, wherein the securing shaft is configured to be moved into and out of the component when the securing stud is in the collapsed position, wherein the securing shaft is configured to couple to the component when the securing stud is in the expanded position, wherein the distal nose is configured to move into and expand the securing stud when the plunger is moved into the extended position; and
a frangible area formed through the housing and the plunger, wherein the frangible area is configured to be broken to remove portions of the housing and the plunger from one or more components while the securing stud remains coupled to the one or more components.

16. The fastening tool system of claim 15, wherein the securing stud comprises a first stud portion and a second stud portion that is distinct from the first stud portion, wherein the first stud portion abuts against the second stud portion when the securing stud is in the collapsed position, and wherein the first stud portion is axially spread apart from the second stud portion when the securing stud is in the expanded position, wherein each of the first stud portion and the second stud portion comprises:
a head section, wherein a head of the securing stud is defined by the head sections of the first stud portion and the second stud portion; and
a shaft section, wherein an outer surface of the shaft section is threaded, wherein the securing shaft is defined by the shaft sections of the first stud portion and the second stud portion,
wherein a central stem channel recess is defined through one or both of the head section and the shaft section, wherein the central stem channel recesses of the first and second stud portions define a stem channel that is configured to receive the stem.

17. The fastening tool system of claim 1, wherein longitudinal channels extend through the main body, wherein the plunger further includes a cross bar, and wherein the longitudinal channels provide open tracks that retain ends of the cross bar.

18. The fastening tool method of claim 9, wherein the moving comprises moving ends of a cross bar of the plunger within open tracks provided by longitudinal channels of the housing.

19. The fastening tool system of claim 15, wherein longitudinal channels extend through the main body, wherein the plunger further includes a cross bar, and wherein the longitudinal channels provide open tracks that retain ends of the cross bar.

20. The fastening tool system of claim 15, wherein the securing shaft couples to the component without being rotated.

\* \* \* \* \*